United States Patent [19]

Kamiguchi et al.

[11] Patent Number: 5,131,710
[45] Date of Patent: Jul. 21, 1992

[54] JOINT STRUCTURE OF PLATE MEMBERS

[75] Inventors: Yoshihiko Kamiguchi; Yasuo Matsuura, both of Hiroshima, Japan

[73] Assignee: Kurata Corporation, Hiroshima, Japan

[21] Appl. No.: 744,906

[22] Filed: Aug. 14, 1991

[51] Int. Cl.⁵ .................. B62D 25/10; B23K 26/00
[52] U.S. Cl. .................... 296/76; 296/191; 296/29; 180/69.2; 219/121.64
[58] Field of Search .............. 296/76, 146, 191, 202, 296/29; 180/69.2; 219/121.64, 121.63

[56] References Cited

U.S. PATENT DOCUMENTS

| | | | |
|---|---|---|---|
| 4,451,077 | 5/1984 | Brunke et al. | 180/69.2 |
| 4,618,181 | 10/1986 | Tokuda et al. | 296/29 |
| 4,682,002 | 7/1987 | Delle Piane et al. | 219/121.64 |
| 4,776,626 | 10/1988 | Seyler | 296/76 |
| 4,916,284 | 4/1990 | Petrick | 219/121.64 |

Primary Examiner—Robert R. Song
Attorney, Agent, or Firm—Sixbey, Friedman, Leedom & Ferguson

[57] ABSTRACT

A first plate member is insetted at its end portion between a body part and a return part of a second plate member. A first swelling part is formed at the end portion of the first plate member so as to protrude to a side of the return part of the second plate member. A second swelling part is formed at a portion corresponding to the first swelling part in the return part of the second plate member so as to be in face-to-face contact with the first swelling part. The first and second swelling parts are joined by laser welding.

2 Claims, 2 Drawing Sheets

JOINT STRUCTURE OF PLATE MEMBERS

BACKGROUND OF THE INVENTION

This invention relates to a joint structure of two plate members hemmed in such a manner that one plate member is insetted between a body part and a return part of the other plate member, such as an outer plate part for a vehicle, for example, a bonnet, a trunk lid, etc.

An outer plate member for a vehicle, such as a bonnet, trunk lid, etc. is composed of an outer panel and an inner panel, assembled. The outer panel has a return part at its end portion and a body part. When assembling the outer panel and inner panel, conventionally, the inner panel is insetted at its end portion between the body part and the return part of the outer panel, and then the return part, the end portion of the inner panel and the body part are spot-welded.

In this case, however, where the hemmed outer and inner panels are spot welded, the body part and the return part which are insetting the end portion of the inner panel are nipped by a head electrode and a back electrode for spot welding to conduct an electric current therebetween. This results in a strain owing to application of a pressure by both electrodes and scabs upon spot welding at the spot-welded point. This requires to remove the strain and the scabs after spot welding, which leads to increase in time required for assembling work.

In a production line with less quantity and various kinds of products, a type of the plate members to be conveyed on an assembly line is frequently altered, which means that a point to be welded must be changed. Therefore, the position of the back electrode for supporting the plate members is required to be changed. However, since the back electrode is fixed to a rack for one type of the plate member, an exclusive rack having a differentiated position of the back electrode is prepared for each type of the plate members. Thus, the cost of equipment increases and an efficiency of assembling work lowers owing to a troublesome changing operation of the racks.

It has been devised that after the first plate member is insetted at its end portion between the body part and the return part of the second plate member, the return part of the second plate member and the end portion of the first plate member is laser-welded by irradiating a laser beam at the return part thereof.

In this case, though the problems that the scabs remain on the body part of the second plate member and the position of the back electrode for supporting the plate members must be changed are solved, a thermal strain shall remain at the body part of the second plate member owing to heat of the laser welding.

Further, in a case where the first plate member is adhered to second plate member with an adhesive beforehand, the adhesive generates gas at the time of laser welding. Since the gas diffuses between the first plate member and the second plate member, the adhered plate members shall be separated each other.

SUMMARY OF THE INVENTION

It is an object of the present invention to prevent the thermal strain at the body part of the second plate member owing to laser welding, and to prevent the plate members from being separated each other by the gas generated by the adhesive between the first and second plate members.

A joint structure of the plate members in the present invention comprises a first plate member and a second plate member including a return part at its one end portion and a body part, wherein an end portion of the first plate member is insetted between the body part and the return part of the second plate member, a first swelling part is formed at the end portion of the first plate member so as to protrude to the side of the return part of the second plate member, a second swelling part is formed at a portion corresponding to the first swelling part in the return part of the second plate member so as to protrude in a same direction as of the first swelling part and to be in face-to-face contact with the first swelling part, and the first and second swelling parts are joined by laser welding.

Under the above structure, since the first swelling part formed at the end portion of the first plate member and the second swelling part formed at the return part of the second plate member protrude in the same direction and are in face-to-face contact with each other, the first and second swelling parts are firmly joined by laser welding.

Both first and second swelling parts protrude to the side of the return part so as to form a space between the first swelling part of the first plate member and the body part of the second plate member. The space makes the heat by laser welding hard to transfer to the body part of the second plate member, which leads to no occurrence of the thermal strain at the body part of the second plate member.

In the case where first plate member and the second plate member are adhered with an adhesive, the gas generated by the adhesive are confined in the space, and then flows outside therefrom, so as not to diffuse between both plate members.

PREFERRED EMBODIMENT OF THE INVENTION

A description is made below of a preferred embodiment of the present invention with reference to accompanying drawings.

Figure 1:
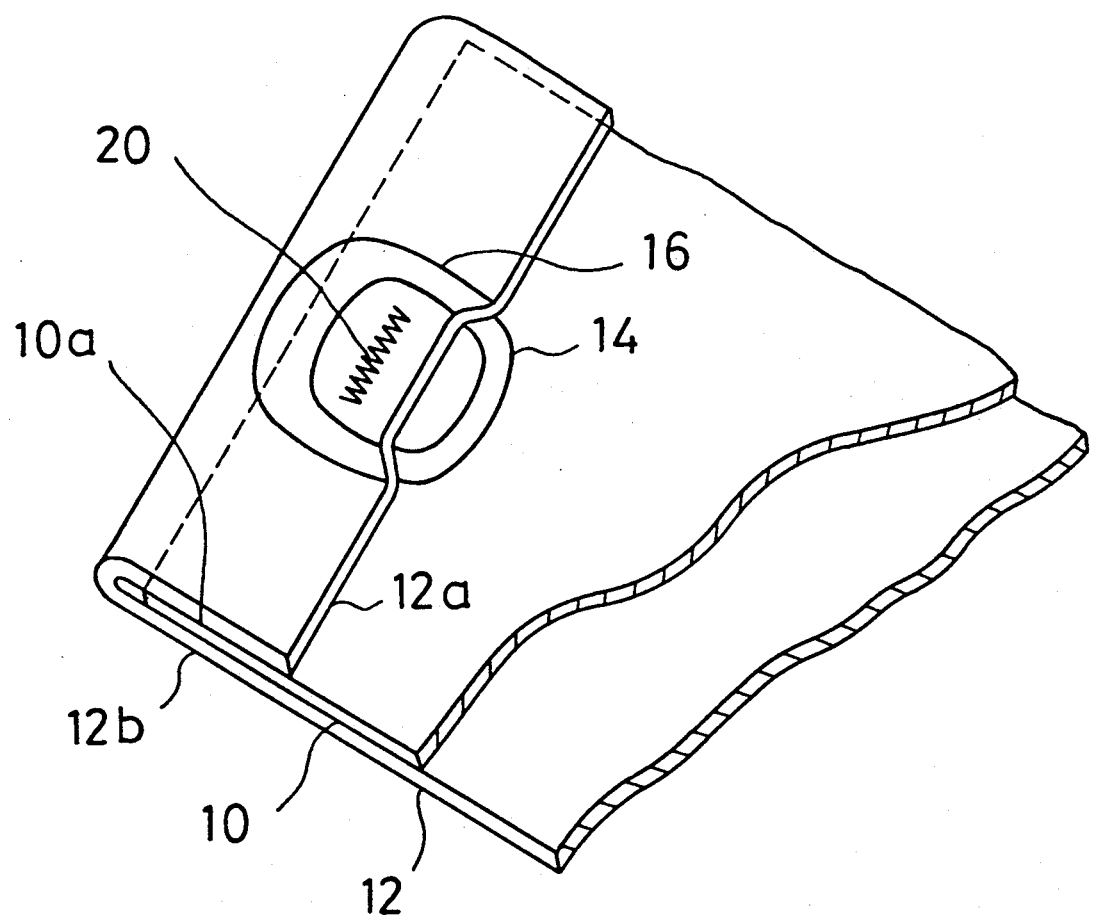
FIG. 1 is a perspective view, showing a joint structure of plate members in an embodiment of the present invention.
Figure 2:
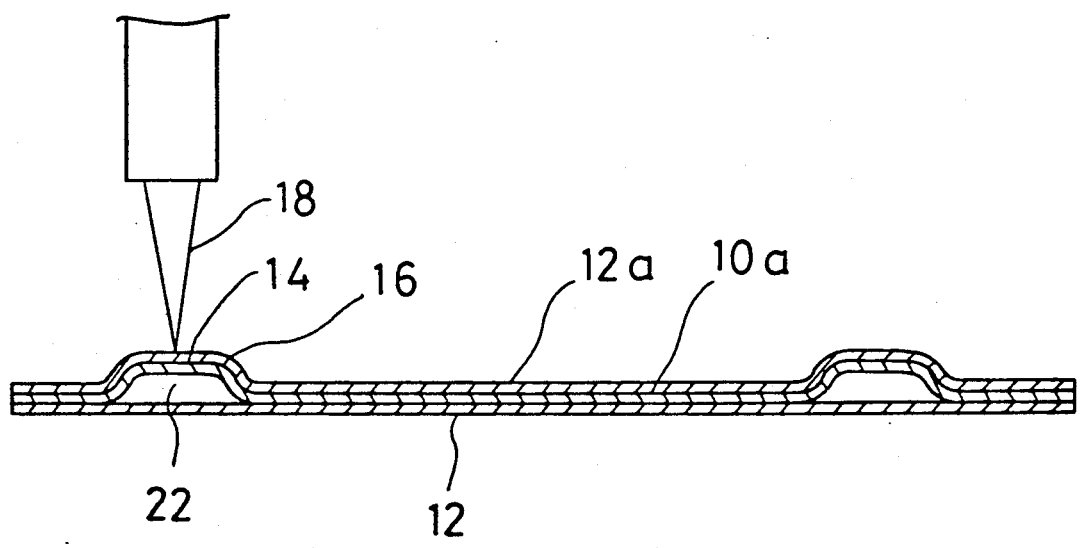
FIG. 2 is a section view, showing the joint structure of the plate members.

FIGS. 1 and 2 show a joint structure of plate members in the preferred embodiment of the present invention. In FIGS. 1 and 2, reference numeral 10 designates a first plate member as an inner panel of a lid for a vehicle, and 12 designates a second plate member as an outer panel of the lid for the vehicle, including a body part 12b and a return part 12a returned at an end portion to a reverse side (upper side in FIGS. 1 and 2).

The first plate member 10 is insetted at its end portion 10a between the body part 12b and the return part 12a of the second plate member 12. The end portion 10a of the first plate member 10 and the body part 12b of the second plate member 12 are adhered at the outer surface thereof and the inner surface thereof respectively by an adhesive (not shown in the drawings).

Each first swelling part 14 is formed at the end portion 10a of the first plate member 10 along its edge line thereof, with certain intervals. The swelling part 14 protrudes to the inside of the first plate member 10, i.e., the side of the return part 12a of the second plate member 12. Each second swelling part 16 is formed at a portion corresponding to the first swelling part 14 in the return part 12a of the second plate member 12. The second swelling part 16 protrudes to the inside of the second plate member 12, i.e., in the same direction as of the swelling part 14. The first and second swelling parts 14, 16 are in face-to-face contact with each other.

As shown in FIG. 2, a laser beam 18 is irradiated to the inner surface of the second swelling part 16 so as to join the second swelling part 16 of the second plate member 12 and the first swelling part 14 of the first plate member 10 at a laser-welded part 20. Since the first and second swelling parts 14, 16 are in face-to-face contact with each other, both swelling parts are joined at the laser-welded part 20 firmly.

Both first and second swelling parts 14, 16 protrude inside so as to form a space 22 between the first swelling part 14 and the body part 12b of the second plate member 12. Thus, the space 22 makes heat by the laser beam 18 hard to be transferred to the body part 12b of the second plate member 12, which leads to no occurrence of a thermal strain at the body part 12b of the second plate member 12.

Though the adhesive near the laser-welded part 20 between the outer surface of the first plate member 10 and the inner surface of the second plate member 12 generates gas by the heat of the laser beam 18, the gas is confined in the space 22, so as not to diffuse between the end portion 10a of the first plate member 10 and the body part 12b of the second plate member 12. This results in that the first and second plate members 10, 12 do not separate each other.

What is claimed is:

1. A joint structure of plate members in which a first plate member is insetted at its end portion between a return part and a body part of a second plate member, an improvement comprising:

a first swelling part formed at said end portion of said first plate member so as to protrude to a side of said return part of said second plate member creating a space between said first swelling part and said body part of said second plate member; and a second swelling part formed at a portion corresponding to said first swelling part in said return part of said second plate member so as to protrude in a same direction as said first swelling part and to be in face-to-face contact with said first swelling part, wherein said first swelling part and said second swelling part are joined by laser welding.

2. A joint structure of plate members according to claim 1, wherein said first plate member is an inner panel of a lid for a vehicle, and said second plate member is an outer panel of the lid for the vehicle.

* * * * *